(12) United States Patent
Oprea et al.

(10) Patent No.: US 8,943,696 B2
(45) Date of Patent: Feb. 3, 2015

(54) METHOD TO PRODUCE SUSPENSION MODULE AND FRAME THAT REDUCES NEED FOR FINAL ALIGNMENT

(75) Inventors: Adrian N. Oprea, Macomb Township, MI (US); Gregory P. Kiselis, Oak Ridge, NC (US); Jeffrey W. Nichols, Pinckney, MI (US); Andrew Slupecki, Windsor (CA); Sampath Rengarajan, Ann Arbor, MI (US)

(73) Assignee: Magna International Inc., Aurora, Ontario (CA)

( * ) Notice: Subject to any disclaimer, the term of this patent is extended or adjusted under 35 U.S.C. 154(b) by 786 days.

(21) Appl. No.: 12/679,541

(22) PCT Filed: Aug. 11, 2008

(86) PCT No.: PCT/CA2008/001449
§ 371 (c)(1),
(2), (4) Date: Mar. 23, 2010

(87) PCT Pub. No.: WO2009/043140
PCT Pub. Date: Apr. 9, 2009

(65) Prior Publication Data
US 2010/0205806 A1    Aug. 19, 2010

Related U.S. Application Data

(60) Provisional application No. 60/977,127, filed on Oct. 3, 2007.

(51) Int. Cl.
*B21D 53/88*    (2006.01)
*B60G 9/00*    (2006.01)
(Continued)

(52) U.S. Cl.
CPC .............. *B62D 65/12* (2013.01); *B60G 9/025* (2013.01); *B60G 2200/14* (2013.01); *B60G 2200/18* (2013.01); *B60G 2200/30* (2013.01); *B60G 2200/342* (2013.01); *B60G 2200/46* (2013.01)
USPC ................... 29/897.2; 29/407.05; 280/124.1

(58) Field of Classification Search
CPC ........ B60G 3/26; B60G 5/04; B60G 2200/14; B60G 2200/31; B60G 2200/21; B62D 17/00
USPC .............. 29/407.05, 464, 897.2, 428; 33/203, 33/203.18; 280/86.75, 124.1, 124.11, 280/124.134, 781, 124.102, 124.15; 73/579; 180/348, 378

See application file for complete search history.

(56) References Cited

U.S. PATENT DOCUMENTS 2,789,830 A *   4/1957   Miller et al. ........... 280/124.128
3,942,815 A *   3/1976   Schwenk et al. ....... 280/124.146
(Continued)

*Primary Examiner* — Alexander P Taousakis
(74) *Attorney, Agent, or Firm* — Dickinson Wright PLLC

(57) ABSTRACT

A method of assembling a frame and suspension module includes determining locations of first and second suspension member supports on the frame. Target positions of first and second connections between the frame and third and fourth suspension members are defined based on the locations of the first and second suspension member supports. Target positions of third and fourth connections between a fifth suspension member and the first and second suspension members are defined based on the locations and the target positions of the first and second connections. The first and second suspension members are connected to the frame at the locations. The third and fourth suspension members are connected to the frame at the first and second target positions. The fifth suspension member is connected to the first and second suspension members at the third and fourth target positions.

20 Claims, 4 Drawing Sheets

(51) Int. Cl.
*B62D 65/12* (2006.01)
*B60G 9/02* (2006.01)

(56) References Cited

U.S. PATENT DOCUMENTS

| | | | | |
|---|---|---|---|---|
| 4,022,494 A | * | 5/1977 | Allison | 280/124.167 |
| 4,334,696 A | * | 6/1982 | Bergstrom | 280/124.104 |
| 4,341,397 A | * | 7/1982 | Morimura et al. | 280/124.106 |
| 4,373,743 A | * | 2/1983 | Parsons, Jr. | 280/124.138 |
| 4,426,101 A | * | 1/1984 | Dyer | 280/788 |
| 4,611,681 A | * | 9/1986 | Krude et al. | 180/359 |
| 4,637,628 A | * | 1/1987 | Perkins | 280/124.106 |
| 4,758,018 A | * | 7/1988 | Takizawa et al. | 280/124.133 |
| 4,805,286 A | | 2/1989 | Uchida et al. | |
| 4,863,187 A | * | 9/1989 | Artz | 280/86.753 |
| 4,871,187 A | * | 10/1989 | Schaible | 280/124.136 |
| 4,953,278 A | * | 9/1990 | Specktor et al. | 29/402.06 |
| 4,973,075 A | * | 11/1990 | Rori et al. | 280/86.757 |
| 4,989,894 A | * | 2/1991 | Winsor et al. | 280/124.109 |
| 5,116,076 A | * | 5/1992 | Moll | 280/124.138 |
| 5,161,818 A | * | 11/1992 | Kopieczek | 280/124.107 |
| 6,042,131 A | * | 3/2000 | Bailey | 280/86.75 |
| 6,076,840 A | * | 6/2000 | Kincaid et al. | 280/124.107 |
| 6,113,120 A | * | 9/2000 | Heap | 280/124.135 |
| 6,705,626 B2 | | 3/2004 | Chevillard | |
| 6,752,409 B1 | * | 6/2004 | Kunert | 280/124.138 |
| 7,188,850 B2 | * | 3/2007 | Ziech et al. | 280/93.512 |
| 7,258,355 B2 | * | 8/2007 | Amano | 280/124.134 |
| 7,270,336 B2 | * | 9/2007 | Fujimori | 280/5.511 |
| 7,434,823 B2 | * | 10/2008 | Robinson | 280/124.153 |
| 7,559,562 B2 | * | 7/2009 | Minoshima | 280/124.106 |
| 2002/0043780 A1 | * | 4/2002 | Sandahl et al. | 280/124.135 |
| 2005/0146105 A1 | * | 7/2005 | Soles et al. | 280/86.75 |
| 2006/0279056 A1 | | 12/2006 | Minoshima | 280/124.1 |
| 2007/0045980 A1 | * | 3/2007 | Lopez et al. | 280/124.116 |
| 2007/0114745 A1 | * | 5/2007 | Neag et al. | 280/124.1 |
| 2009/0066048 A1 | * | 3/2009 | Mayenburg et al. | 280/124.11 |
| 2009/0115155 A1 | * | 5/2009 | Kiselis et al. | 280/124.116 |
| 2009/0218780 A1 | * | 9/2009 | Mauz | 280/124.109 |
| 2010/0044988 A1 | * | 2/2010 | Rochester et al. | 280/124.116 |
| 2011/0001300 A1 | * | 1/2011 | Juriga | 280/124.116 |
| 2013/0069335 A1 | * | 3/2013 | Erdogan | 280/124.128 |

\* cited by examiner

METHOD TO PRODUCE SUSPENSION MODULE AND FRAME THAT REDUCES NEED FOR FINAL ALIGNMENT

CROSS REFERENCE TO RELATED APPLICATINS

This U.S. National Stage Patent Application claims priority to PCT International Application No. PCT/CA2008/001449 filed Aug. 11, 2008, entitled "Method To Produce Suspension Module And Frame That Reduces Need For Final Alignment" which claims the benefit of U.S. Provisional Patent Application Ser. No. 60/977,127 filed Oct. 3, 2007, the entire disclosures of the applications being considered part of the disclosure of this application, and hereby incorporated by reference.

BACKGROUND

Vehicle assembly typically includes interconnecting many components supplied from various manufacturers. Each of the components may include a number of geometrical features, such as size, shape and position, that may vary and still be within an acceptable tolerance range. To predict the dimensional characteristics of the completed vehicle after assembly, the interrelation or "stack-up" of the tolerances of the various components must be addressed.

For example, many vehicles are equipped with suspensions rotatably mounting vehicle wheels to a frame. To obtain optimum vehicle performance, it may be desirable to set the angular orientation of one or more wheels relative to the frame. A desired wheel position may be indicated by measuring camber, caster and toe. At least one known vehicle suspension includes special cam fasteners that vary the camber, caster and/or toe of an individual wheel by rotating the cam. Once the wheel alignment is properly adjusted, the cam may be fixed at a desired location by a retention mechanism such as a threaded fastener. To accurately set wheel alignment, the vehicle assembly manufacturing facility may be equipped with relatively large and costly alignment machines used to accurately measure the camber and caster of the vehicle wheels. Operators may be required to operate the alignment machine and adjust the cam fasteners until each wheel is within a desired specification range. At this time, the suspension components may be fixed at the adjusted position.

Accordingly, it should be appreciated that great cost and time may be expended to align vehicle wheels to account for the manufacturing tolerances of the various components. In particular, special cam bolts and/or other fasteners may be required at a number of component joints within the vehicle suspension to allow adjustment of the camber, caster and toe of each wheel. Specialty equipment may be required for measuring the position of the wheels and allowing measurement before and after alignment procedures are conducted at the manufacturing plant. Additional burden related to the floor space, operation and manning the alignment equipment also exists. Certain warranty costs may also be associated with vehicles that may be improperly aligned at the manufacturing plant.

SUMMARY

A method of assembling a frame and suspension module includes determining locations of first and second suspension member supports on the frame. Target positions of first and second connections between the frame and third and fourth suspension members are defined based on the locations of the first and second suspension member supports. Target positions of third and fourth connections between a fifth suspension member and the first and second suspension members are defined based on the locations and the target positions of the first and second connections. The first and second suspension members are connected to the frame at the locations. The third and fourth suspension members are connected to the frame at the first and second target positions. The fifth suspension member is connected to the first and second suspension members at the third and fourth target positions.

Another method of assembling a frame and suspension module includes defining a line based on locations of first and second suspension member supports on the frame. Target positions of first and second connections between the frame and third and fourth suspension members are defined based on the line. A surface is defined based on the line and the target positions of the first and second connections. Target positions of third and fourth connections between a fifth suspension member and the first and second suspension members are defined based on the surface. First and second suspension members are connected to the frame at the locations. Third and fourth suspension members are connected to the frame at the first and second target positions. The fifth suspension member is connected to the first and second suspension members at the third and fourth target positions.

Further areas of applicability will become apparent from the description provided herein. It should be understood that the description and specific examples are intended for purposes of illustration only and are not intended to limit the scope of the present disclosure.

The present invention is generally directed to a method of assembling a frame and suspension module. The method includes the steps of: determining locations of a first trailing arm support and a second trailing arm support on the frame for coupling a first trailing arm and a second trailing arm to the frame; defining first and second target positions on the frame of a first connection between the frame and a first upper control arm and a second connection between the frame and a second upper control arm, based on the locations; defining third and fourth target positions of a third connection and a fourth connection, each between a compound link and one of the first trailing arm and the second trailing arm, based on the locations and the target positions of first and second connections; connecting the first trailing arm and the second trailing arm to the frame at the locations; connecting the first upper control arm and the second upper control arm to the frame at the first and second target positions; and connecting the compound link to the first trailing arm and the second trailing arm at the third and fourth target positions.

The method may further include a step of forming apertures through the compound link at the target positions of the third and fourth connections, wherein the apertures are formed at opposite ends of the compound link. In addition, the first trailing arm and the second trailing arm extend substantially longitudinally, relative to the frame, while the first upper control and second upper control arms extend substantially transversely, relative to the frame, and the compound link extends substantially transversely relative to the frame.

The method further includes a step of engaging a spring with the compound link and the frame. In addition, the first upper control arm and the second upper control arm are rotatably connected directly with the first trailing arm and the second trailing, and the rotatable pivot arm is coupled to the compound link.

The method of the present invention is further directed to a method of assembling a frame and suspension module, including the steps of: defining a line based on locations of first trailing arm and second trailing arm supports on the frame; defining first and second target positions on the frame of first and second connections between the frame and first and second upper control arms based on the line; defining a surface based on the line and the target positions of first and second connections; defining third and fourth target positions on a compound link of third and fourth connections between the compound link and a first trailing arm and second trailing arm based on the surface; connecting the first trailing arm and the second trailing arm to the frame at the locations; connecting the first and second upper control arm to the frame at the first and second target positions; and connecting the compound link to the first trailing arm and the second trailing arm at the third and fourth target positions.

The method further includes the steps of forming apertures through the compound link at the target positions of the third and fourth connections, and connecting a rotatable pivot arm to the compound link. In addition, the first trailing arm and second trailing arm extend substantially longitudinally relative to the frame.

DRAWINGS

The drawings described herein are for illustration purposes only and are not intended to limit the scope of the present disclosure in any way.

FIG. 1 is a fragmentary perspective view of a frame and suspension module of a vehicle;

FIG. 2 if a fragmentary perspective view of the frame depicted in FIG. 1;

DETAILED DESCRIPTION

Figure 1:
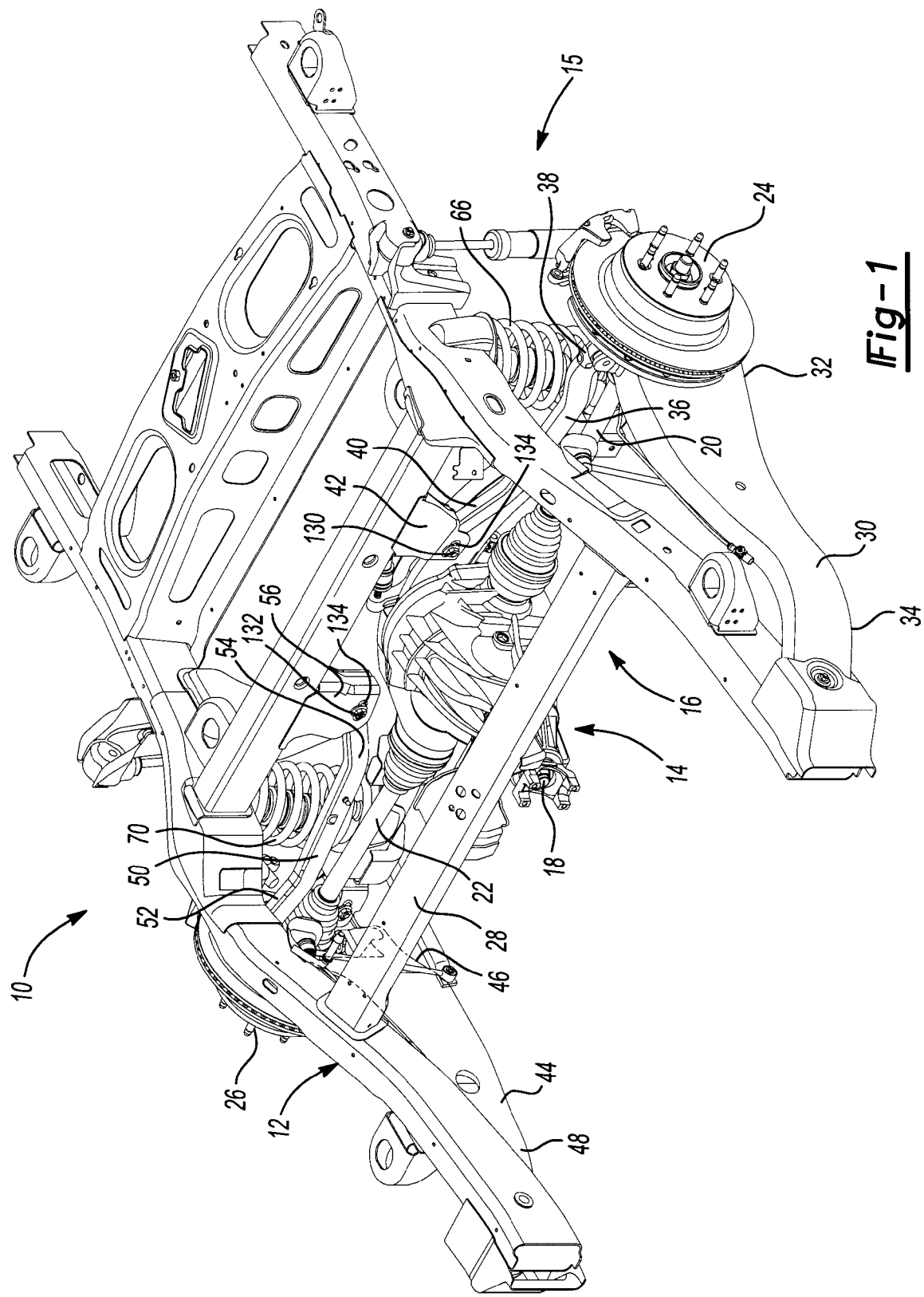

The following description is merely exemplary in nature and is not intended to limit the present disclosure, application, or uses. It should be understood that throughout the drawings, corresponding reference numerals indicate like or corresponding parts and features.

With reference to FIG. 1, a portion of an exemplary vehicle 10 includes a frame 12 and a suspension assembly 14 coupled to one another to form a frame and suspension module 15. A driveline 16 includes a transaxle 18 having a first output shaft 20 and a second output shaft 22. First output shaft 20 drives a first wheel hub 24 and second output shaft 22 drives a second wheel hub 26. A cross member 28 is mounted to frame 12 and supports transaxle 18.

Suspension assembly 14 includes a first trailing arm 30 including a first end 32 supporting first wheel hub 24 for rotation. A second end 34 of first trailing arm 30 is rotatably coupled to frame 12. A first upper control arm 36 includes one end 38 rotatably coupled to first trailing arm 30. An opposite end 40 of first upper control arm 36 is rotatably coupled to a first upper control arm bracket 42. First upper control arm bracket 42 is mounted to frame 12. The opposite side of vehicle 10 is equipped with a second trailing arm 44 having a first end 46 and a second end 48, a second upper control arm 50 having ends 52 and 54 as well as a second upper control arm bracket 56. The "second" components are substantially mirror images of the previously discussed "first" components on the opposite side of vehicle 10.

Suspension assembly 14 also includes a compound link 60 having a first end 62 and a second end 64. A first spring 66 is positioned on a first spring seat 68 mounted to first end 62 of compound link 60. A second spring 70 is positioned on a second spring seat 72. Second spring seat 72 is fixed to second end 64 of compound link 60. First spring 66 and second spring 70 are each positioned between compound link 60 and frame 12. Accordingly, compound link 60 is movable relative to frame 12.

With reference to FIGS. 1-4, suspension assembly 14 also includes a pivot arm assembly 74 rotatably coupled to compound link 60. A first link 76 includes a first end 78 coupled to a first portion 80 of pivot arm assembly 74. A second end 82 of first link 76 is coupled to frame 12. In similar fashion, a second link 86 includes a first end 88 coupled to a second portion 90 of pivot arm assembly 74. A second end 92 of second link 86 is coupled to frame 12. During vehicle operation, compound link 60 may move relative to frame 12. In particular, first end 62 may move relative to frame 12 in the same or opposite direction and at the same or different magnitude as second end 64 moves relative to frame 12. Lateral movement of compound link 60 relative to frame 12 is limited by pivot arm assembly 74, first link 76 and second link 86.

Figure 2:
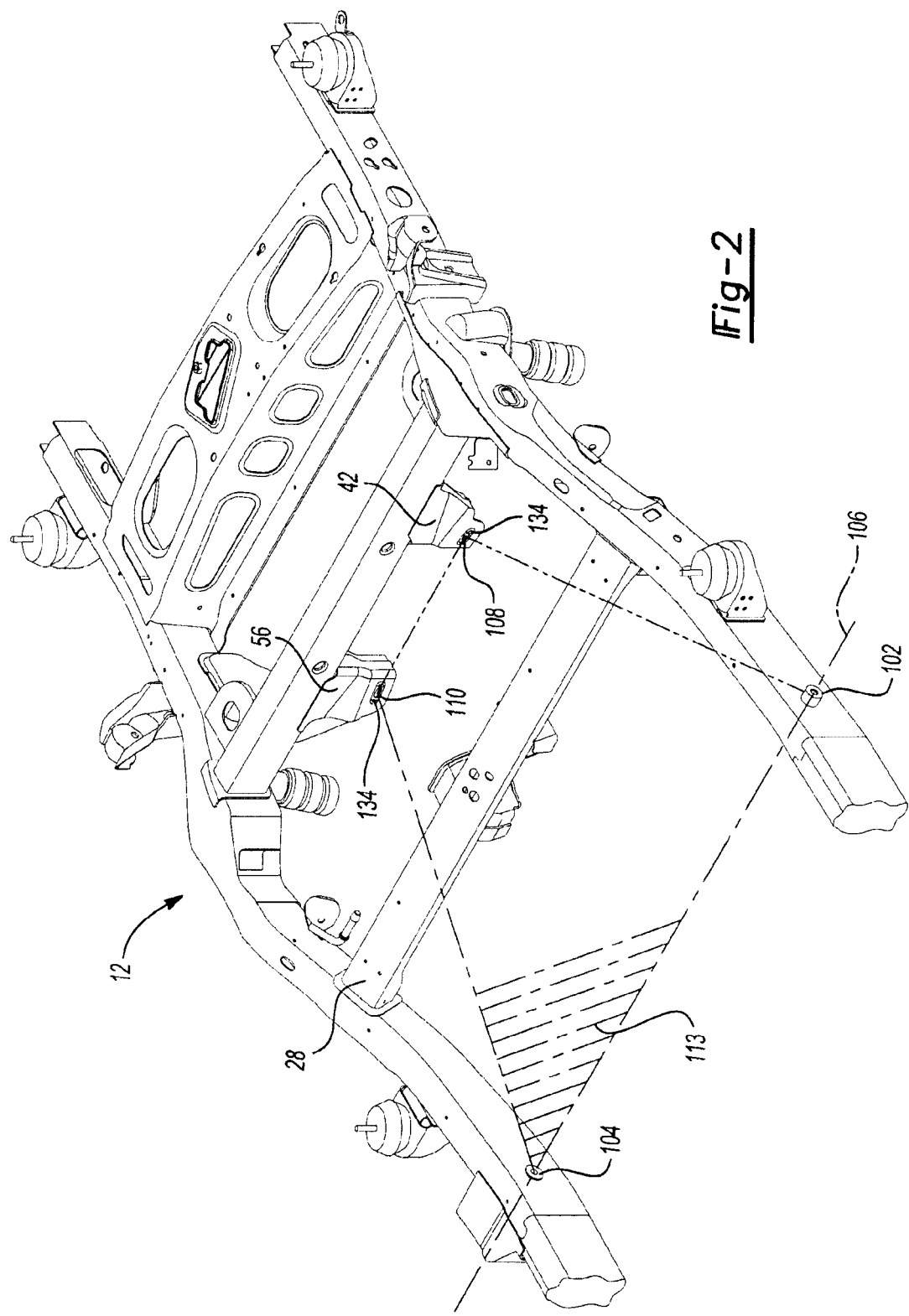
Figure 3:
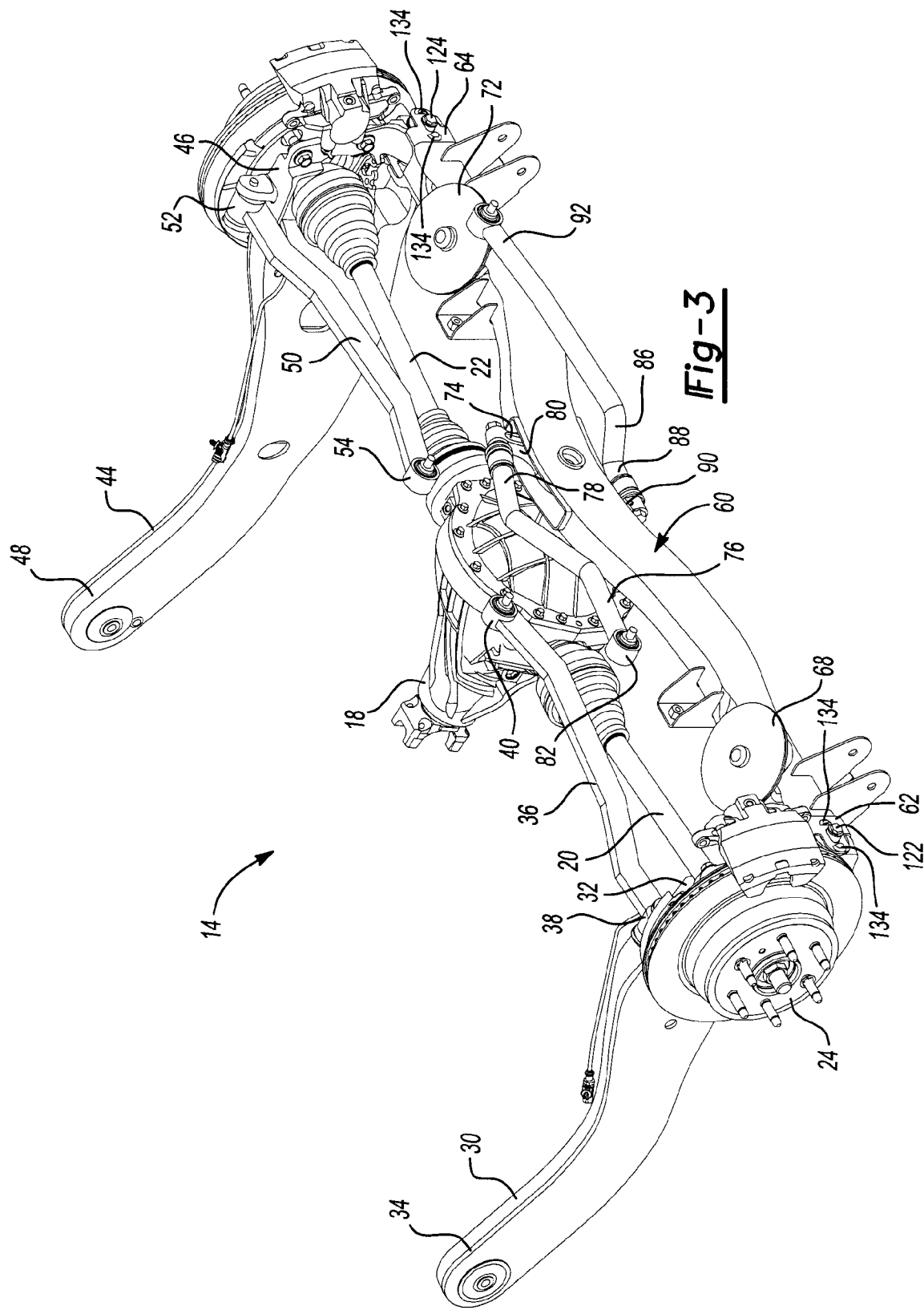
FIG. 3 is a perspective view of the suspension assembly shown in FIG. 1.
Figure 4:
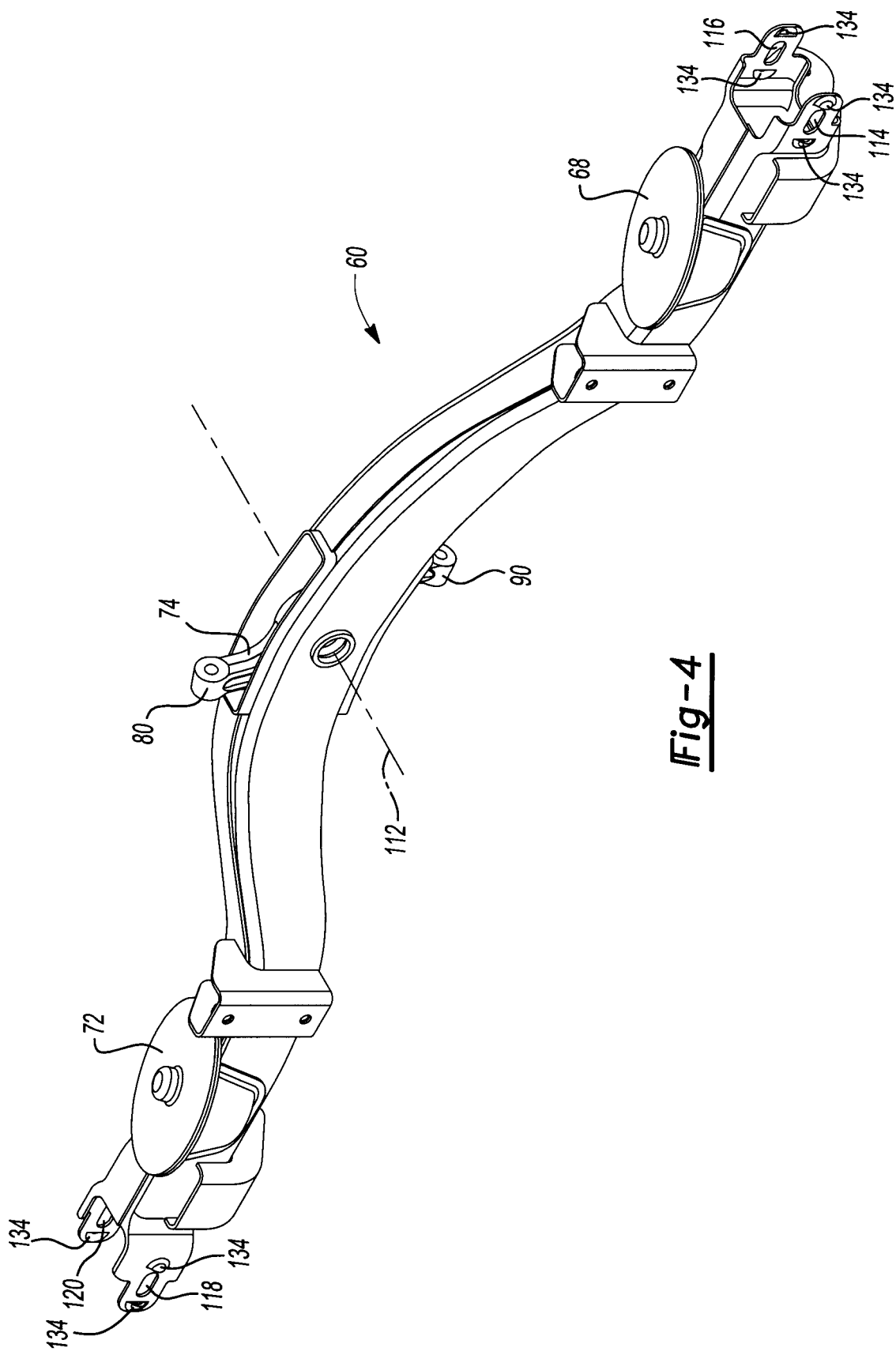
FIG. 4 is a perspective view of a compound link also depicted in FIGS. 1 and 3.

FIG. 2 depicts frame 12 having a number of components fixed thereto including first and second trailing arm mounting sleeves 102, 104 as well as first and second upper control arm brackets 42, 56. To obtain a vehicle 10 having properly aligned wheels at initial build, one particular frame 12 is designated for assembly with one particular suspension assembly 14 as depicted in FIG. 3. Suspension assembly 14 is a subassembly including first trailing arm 30, second trailing arm 44, first upper control arm 36, second upper control arm 50, compound link 60, pivot arm assembly 74, first link 76, second link 86, transaxle 18, first output shaft 20 and second output shaft 22, among others. By implementing a method described hereinafter, suspension assembly 14 may be coupled to frame 12 without the use of special cam fasteners. Furthermore, after assembly of suspension assembly 14 to frame 12, vehicle 10 may not require a wheel alignment procedure due to the accuracy of wheel position obtained at initial assembly.

In particular, the method of assembling frame and suspension module 15 includes determining the location of first trailing arm mounting sleeve 102 and second trailing arm mounting sleeve 104. A line 106 is defined based on the locations of mounting sleeves 102 and 104. A target position is calculated for the interconnection of first upper control arm 36 with first upper control arm bracket 42 based on the locations of sleeves 102, 104 and/or line 106 that the sleeves define. Similarly, a target location for the interconnection of second upper control arm 50 and second upper control arm bracket 56 is determined based on the location of the trailing arm sleeves and/or the line data. Once the target joint positions have been determined, a first slot 108 is pierced through first upper control arm bracket 42 having the nominal position or center of the slot being located at the target location. In similar fashion, a second slot 110 is pierced through second upper control arm bracket 56 having a center of the slot positioned at the target location. At this time, the frame is identified so that this specific frame may be later coupled to a particular suspension assembly 14.

Using data representing the location of first trailing arm sleeve 102, second trailing arm sleeve 104, first slot 108, second slot 110 and a location of a center point 112 of compound link 60, a response surface 113 is defined. Target locations for first through fourth compound link slots 114, 116, 118, 120 are determined based on the response surface data. Slots 114-120 are pierced at the target locations.

Suspension assembly 14 is constructed using the specific compound link 60 previously pierced with slots 114-120. A first fastener 122 extends through slots 114 and 116 to pivotally interconnect compound link 60 and first trailing arm 30. A second fastener 124 extends through slots 118 and 120 to pivotally interconnect compound link 60 and second trailing arm 44. Fasteners 122 and 124 may be tightened at the nominal or center position of slots 114-120.

Once the assembly of suspension assembly 14 has been completed, suspension assembly 14 is coupled to frame 12 to form frame and suspension module 15. At this time, second end 34 of first trailing arm is coupled to first trailing arm sleeve 102. Similarly, second end 48 of second trailing arm 44 is rotatably coupled to second trailing arm mounting sleeve 104. End 40 of first upper control arm 36 is rotatably coupled to first upper control arm bracket 42 by a threaded fastener 130 extending through slot 108. Fastener 130 may be located at the nominal or center position of slot 108. Likewise, end 54 of second upper control arm 50 is rotatably coupled to second upper control arm bracket 56 with a threaded fastener 132. Fastener 132 extends through slot 110 and may be tightened when located at the nominal or center position of slot 110. Various other components including first link 76 and second link 86 are interconnected to frame 12 to complete frame and suspension module 15.

After some period of vehicle use, it may be desirable to service or replace various suspension components or align the vehicle wheels. It is contemplated that fasteners 122, 124, 130 and/or 132 may be replaced with a traditional cam bolt. Bosses or "eyebrows" 134 are formed adjacent slots 108, 110, 114, 116, 118 and 120. Each boss 134 provides a seat for each cam bolt. Rotation of one of the cam bolts moves the pivot point between the interconnected components to a different location along the respective slot through which the cam bolt extends. Accordingly, a method and apparatus exists to set the proper wheel alignment after replacing or repairing various suspension components.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A method of assembling a frame and suspension module, comprising:
   determining locations of a first trailing arm support and a second trailing arm support on said frame for coupling a first trailing arm and a second trailing arm to the frame;
   defining first and second target positions on said frame of a first connection between said frame and a first upper control arm and a second connection between said frame and a second upper control arm, based on said locations;
   defining third and fourth target positions of a third connection and a fourth connection, each between a compound link and one of said first trailing arm and said second trailing arm, based on said locations and said target positions of first and second connections;
   connecting said first trailing arm and said second trailing arm to said frame at said locations;
   connecting said first upper control arm and said second upper control arm to said frame at said first and second target positions; and
   connecting said compound link to said first trailing arm and said second trailing arm at said third and fourth target positions.

2. The method of claim 1 further including forming apertures through said frame at said first and second target positions of said first and second connections.

3. The method of claim 2 further including forming apertures through said compound link at said target positions of said third and fourth connections.

4. The method of claim 3 wherein said apertures are formed at opposite ends of said compound link.

5. The method of claim 1 wherein said first trailing arm and said second trailing arm extend substantially longitudinally relative to said frame.

6. The method of claim 5 wherein said first upper control and second upper control arms extend substantially transversely relative to said frame.

7. The method of claim 6 wherein said compound link extends substantially transversely relative to said frame.

8. The method of claim 1 further including engaging a spring with said compound link and said frame.

9. The method of claim 1 further including rotatably connecting said first upper control arm and said second upper control arm directly with said first trailing arm and said second trailing arm.

10. The method of claim 1 further including connecting a rotatable pivot arm to said compound link.

11. The method of claim 10 further including interconnecting a first end of said pivot arm to said frame with a first link.

12. The method of claim 11 further including interconnecting a second end of said pivot arm to said frame with a second link.

13. The method of claim 1 further including forming a boss adjacent to at least one apertures formed in said frame.

14. The method of claim 13 further including engaging a cam bolt with said boss.

15. A method of assembling a frame and suspension module, comprising:
   defining a line based on locations of first trailing arm and second trailing arm supports on said frame;
   defining first and second target positions on the frame of first and second connections between said frame and first and second upper control arms based on said line;
   defining a surface based on said line and said target positions of first and second connections;
   defining third and fourth target positions on a compound link of third and fourth connections between said compound link and a first trailing arm and second trailing arm based on said surface;
   connecting said first trailing arm and said second trailing arm to said frame at said locations;
   connecting said first and second upper control arm to said frame at said first and second target positions; and
   connecting said compound link to said first trailing arm and said second trailing arm at said third and fourth target positions.

16. The method of claim 15 further including forming apertures through said frame at said target positions of said first and second connections.

17. The method of claim 16 further including forming apertures through said compound link at said target positions of said third and fourth connections.

18. The method of claim 17 further including connecting a rotatable pivot arm to said compound link.

19. The method of claim 18 wherein said surface is based on a location of a pivot point of said pivot arm.

20. The method of claim 15 wherein said first trailing arm and second trailing arm extend substantially longitudinally relative to said frame.

* * * * *